UNITED STATES PATENT OFFICE.

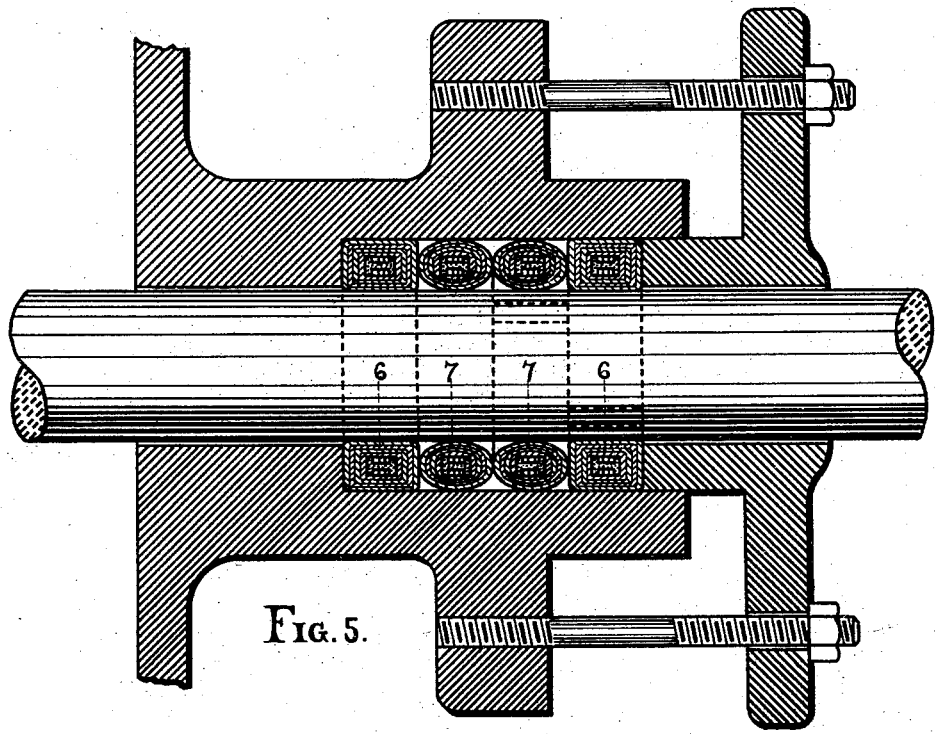

ALEXANDER MONTGOMERY, OF NEWTON, MASSACHUSETTS.

ELASTIC-CORE PACKING.

SPECIFICATION forming part of Letters Patent No. 375,501, dated December 27, 1887.

Application filed September 15, 1887. Serial No. 249,826. (No model.)

*To all whom it may concern:*

Be it known that I, ALEXANDER MONTGOMERY, of Newton, in the county of Middlesex and State of Massachusetts, have invented certain new and useful Improvements in Elastic-Core Anti-Friction Packings, of which the following, taken in connection with the accompanying drawings, is a specification.

My invention relates to elastic-core packings designed to be used in piston and valve rod stuffing-boxes and the like and in pistons of engines, pumps, and the like.

It has for its object the production of an elastic-core anti-friction fibrous packing that will be better adapted to its uses than any other fibrous packing now manufactured.

Figure 1 represents in elevation a piece of my packing of rectangular form, and Fig. 2 is a cross-section of same. Fig. 3 represents in elevation a piece of my packing of elliptic form, and Fig. 4 is a cross-section of same. Fig. 5 represents in sectional view packings in position for use about a piston-rod in a stuffing-box of common form.

The packing 6, as represented by Figs. 1 and 2, is made in lengths, as follows: The I-shaped core 10, of rubber, is made in molds and vulcanized, all in the usual manner, and it has fitted to it between its flanges the rectangular pieces of compressed cork 11 and 12, or other similar well-known elastic substance. The composite core thus made has woven or braided around it a fibrous covering, 13, composed of flax, hemp, or other suitable well-known fibrous material. Then the covering 13 is impregnated and coated preferably with a mineral lubricant of a class that is free from grit, that will not corrode metals, and that will not be destroyed by heat except at excessive temperatures. Then the coverings 14 and 15 and 16 are added and impregnated each in its turn. After a sufficient number of fibrous coverings have been added, preferably four in number, the packing when dried is ready for use.

The packing 7, as represented by Figs. 3 and 4, is made same as packing 6, except that in braiding and charging an elliptic section is obtained. It is a matter largely of personal preference which of the two sectional forms of packing is the better for use. This packing is intended to be used same as any other fibrous packing.

In Fig. 5 I have illustrated the packing as applied to a piston-rod in a stuffing-box of the common style, using two rings of packing of rectangular form and two rings of elliptic form. Each ring is cut shorter than the length required to encircle the piston-rod, and the rings are relatively located so as to break joints. By the screwing up of the stuffing-box flange the packings are forced into contact with the piston-rod, thereby packing the rod in the usual manner.

By making the rubber core I shape, I am able to obtain a more elastic core than if it were of the usual form, round or square, and by making the core composite, the rubber I-shaped core with compressed cork between its flanges, I am able to produce an elastic composite core possessing compound elastic qualities very desirable and useful.

What I claim as new, and desire to secure by Letters Patent, is—

1. In a fibrous packing, the combination of the layers 13, 14, 15, and 16, composed of fibrous material charged with a lubricant, with the I-shaped core 10, substantially as described.

2. In a fibrous packing, the combination of the layers 13, 14, 15, and 16, composed of fibrous material, with the composite core composed of the rubber I-shaped core 10 and the pieces of compressed cork 11 and 12, substantially as and for the purposes set forth.

3. The fibrous packing 6, provided with a compound elastic core composed of the rubber piece 10 and the pieces 11 and 12 of compressed cork, substantially as and for the purposes set forth.

In testimony whereof I have signed my name to this specification, in the presence of two subscribing witnesses, on this 1st day of September, A. D. 1887.

ALEXANDER MONTGOMERY.

Witnesses:
JAMES A. WOODBURY,
E. FRANK WOODBURY.